J. H. ANDERSON.
COMBINATION SHOVELING BOARD AND END GATE.
APPLICATION FILED OCT. 16, 1916.
1,252,381.
Patented Jan. 8, 1918.
3 SHEETS—SHEET 1.
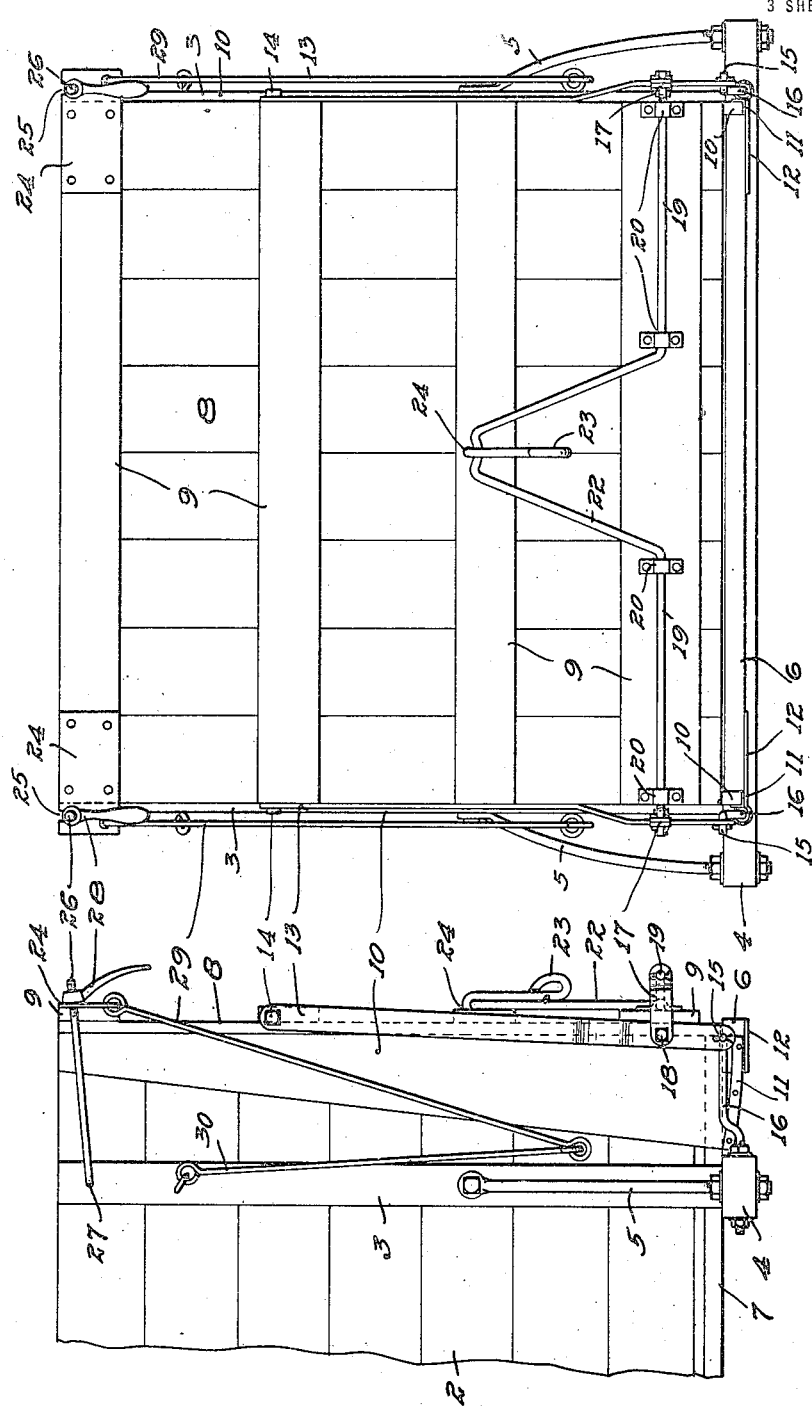
WITNESSES
INVENTOR
JOHN H. ANDERSON
BY
ATTORNEYS J. H. ANDERSON.
COMBINATION SHOVELING BOARD AND END GATE.
APPLICATION FILED OCT. 16, 1916.
1,252,381.
Patented Jan. 8, 1918.
3 SHEETS—SHEET 2.
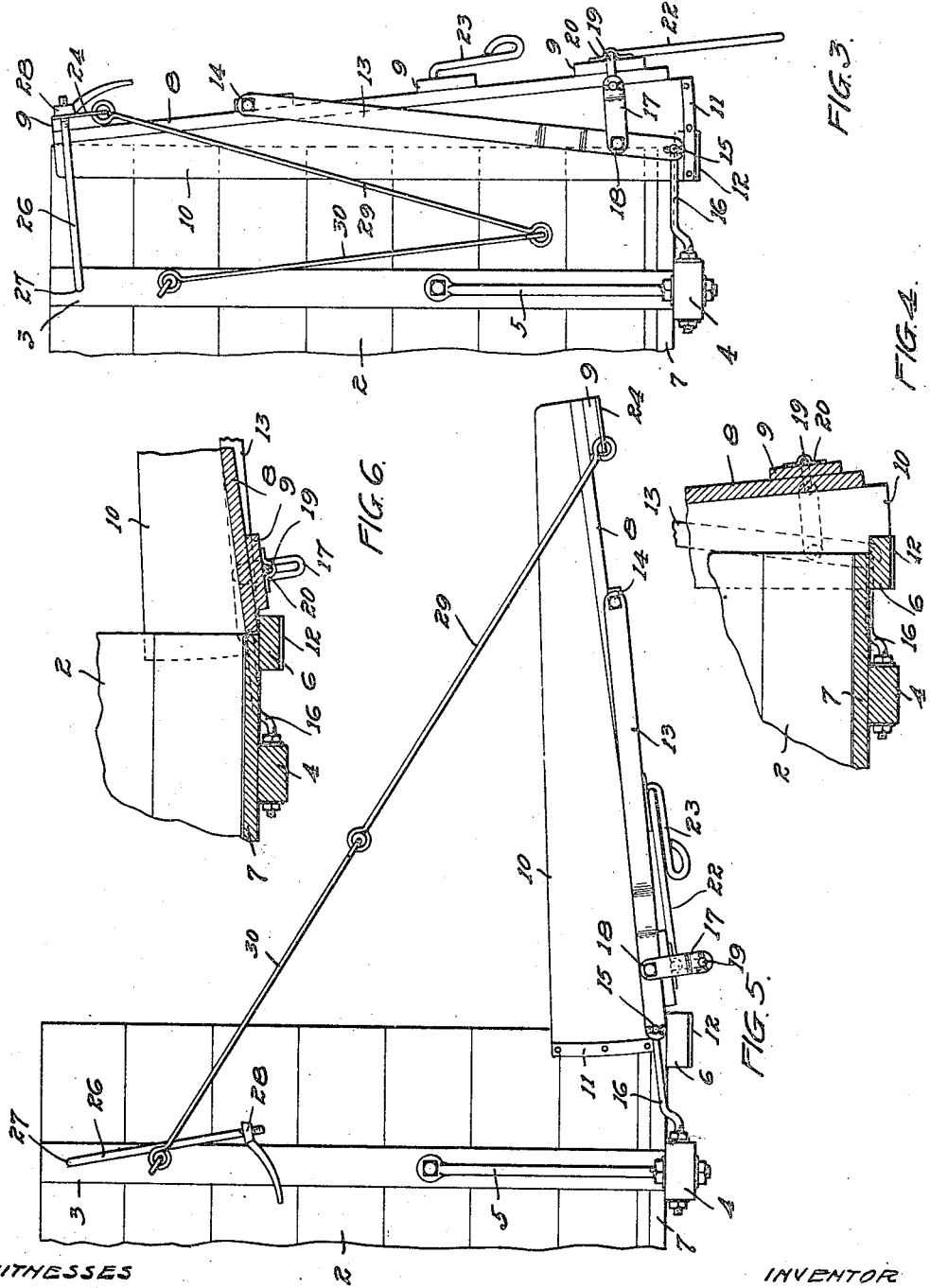
INVENTOR
JOHN H. ANDERSON

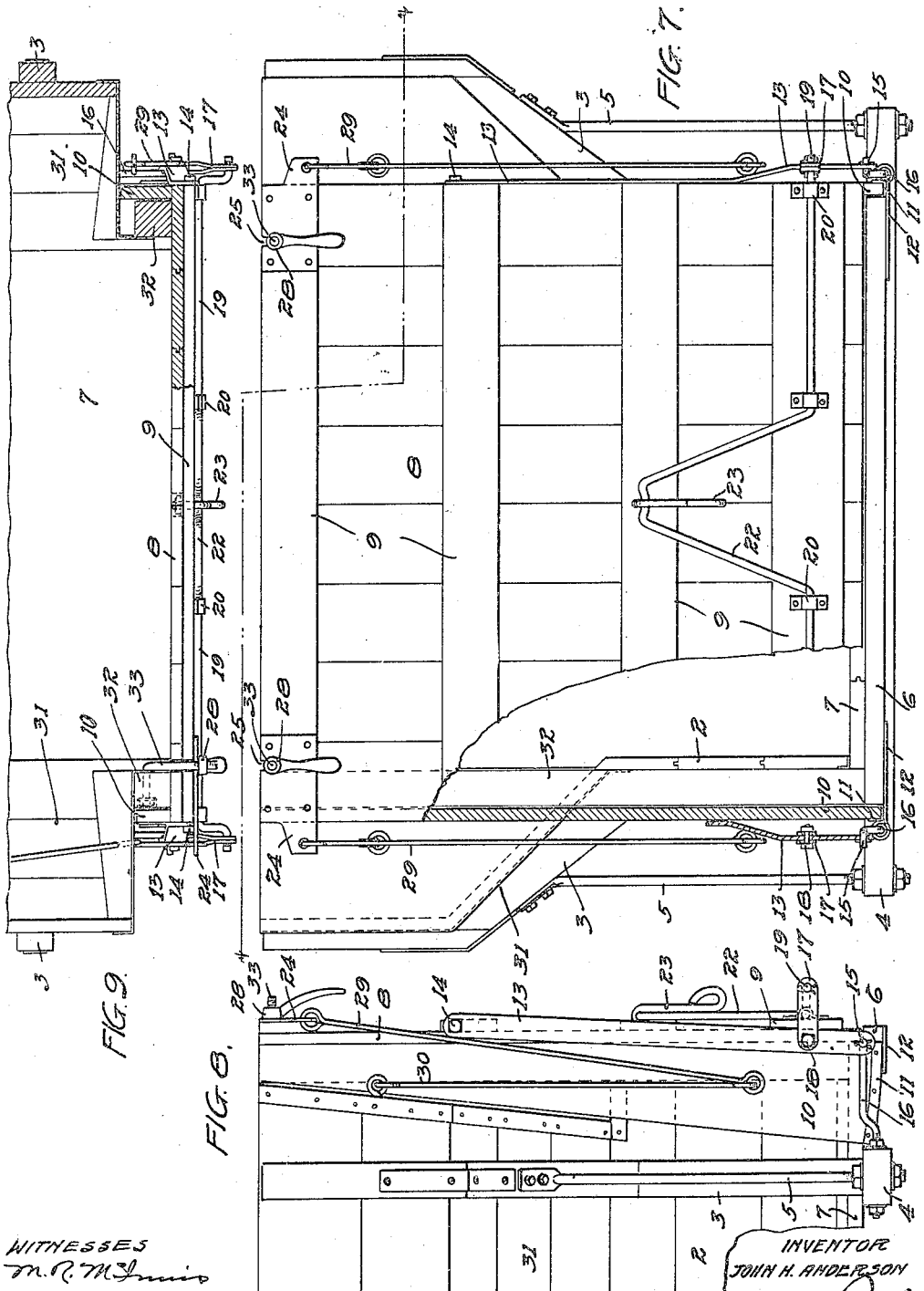

UNITED STATES PATENT OFFICE.

JOHN H. ANDERSON, OF ST. PAUL, MINNESOTA.

COMBINATION SHOVELING-BOARD AND END-GATE.

1,252,381.

Specification of Letters Patent.

Patented Jan. 8, 1918.

Application filed October 16, 1916. Serial No. 125,884.

*To all whom it may concern:*

Be it known that I, JOHN H. ANDERSON, a citizen of the United States, resident of St. Paul, county of Ramsey, State of Minnesota, have invented certain new and useful Improvements in Combination Shoveling-Boards and End-Gates, of which the following is a specification.

My invention relates to wagon boxes and grain tanks and the object of the invention is to provide an end gate which will be flax tight and one that will open at the bottom for unloading grain on a dump.

A further object is to provide a gate which can be utilized as a shoveling board or platform for loading or unloading in and out of the tank.

A further object is to provide an end gate adapted for use with a tank having flaring side walls or a wagon box having vertical side walls.

Other objects of the invention will appear from the following detailed description.

The invention consists generally in various constructions and combinations, all as hereinafter described and particularly pointed out in the claims.

In the accompanying drawings forming part of this specification,

Figure 1 is a rear elevation of the end gate applied to a wagon box,

Fig. 2 is a side elevation of the same, showing the gate in its closed position, Fig. 3 is a similar view, showing the gate open at the bottom for the discharge of the grain, Fig. 4 is a sectional view of the same, showing the discharge opening at the bottom of the gate, Fig. 5 is a side elevation, showing the gate open to form a shoveling board, Fig. 6 is a sectional view of the same, Fig. 7 is a rear elevation, partially in section, of the gate applied to the rear end of a grain tank, Fig. 8 is a side elevation of the same, showing the gate in its closed position, Fig. 9 is a horizontal sectional view, taken on the line *x—x* of Fig. 7, showing the means for securing the gate in position to close the rear end of the tank.

In the drawing 2 represents the side walls of a wagon box, having the upright braces 3 on each side thereof and a cross bar 4 at the bottom, provided with projecting ends which are connected with the middle portion of the braces 3 by rods 5. A cross bar 6 is provided at the extreme rear end of the wagon box parallel with the bar 4 and projecting preferably beyond the rear end of the box bottom 7. 8 is an end gate having cross bars or cleats 9 secured thereto at intervals from the top to the bottom of the gate and on each side the gate is provided with wings 10 which are mounted to lap by the ends of the side walls of the box and the lower ends of these wings are provided with angle bars 11. Straps 12 are provided at each end of the bar 6 and form guides for the angle bars 11. Bars 13 are pivoted at 14 on each side of the gate at a point above the middle portion thereof and the lower ends of these bars have eyes formed therein to receive the ends 15 of bolts 16 which are mounted in the projecting ends of the cross bars 4 and extend rearwardly thereof to a point adjacent to the bars 6. These bars form the pivotal connection of the end gate with the side walls of the box. Links 17 are pivotally connected at 18 to the bars 13 and a bail 19 is mounted in guides 20 on the lower portion of the end gate and has offset ends pivotally connected with the outer ends of links 17. This bail 19 has a middle portion 22 centrally arranged to form a crank by means of which the operator can rock the bail for swinging the lower end of the gate outwardly to provide a grain discharge gap between it and the bottom of the box or to move the gate inwardly to close the gap against the discharge of the grain.

An arm 23 is pivoted at 24 on one of the cross bars 9 of the gate and is adapted to swing down and engage the part 22 and lock the bail to prevent it from rocking in its bearings. When this arm is raised, the bail is released and may be dropped down to the position indicated in Fig. 3 to swing the ends thereof from the position shown in Fig. 2 to that illustrated in Fig. 3, whereupon the gap at the rear end of the floor of the box will be exposed to allow the discharge of the grain. During this movement of the gate the wings 10 will slide back on the walls of the box and close the gap at the sides so that none of the grain can escape between the vertical edges and the side walls of the box.

At the top of the gate on each side thereof I prefer to provide plates 24 having notches 25 therein to receive the threaded ends of rods 26 which are pivoted at 27 in the upright braces 3 and provided on their threaded ends with nuts 28 by means of which the door can be clamped in its closed position. When these nuts are loosened, the rods 26 may be raised and the door released and may then be folded down to the substantially horizontal or shoveling position, as shown in Fig. 5, being supported by links 29 and 30 connected with one another and to the plates 24 and the braces 3. When the gate is turned down to this position, it forms a shoveling board and is substantially a continuation of the floor of the box, the lower edge of the gate turning on the projecting portion of the cross bar 6 and the bolts 16 springing sufficiently to allow for this turning movement. When the end gate is closed, the links 29 and 30 will fold to the position shown in Fig. 2.

In Figs. 7, 8 and 9 the invention is shown applied to a grain tank having flaring walls 31 and upright parallel posts 32 at the rear end of the flaring walls whereon the end gate is mounted. This construction adapts the gate for use with either the wagon box with straight side walls or the grain tank with flaring walls. Plates are provided at the upper end of the gate corresponding to those previously described and bolts 33 are pivoted in the posts 32 and fit into notches in the plates and are provided with a securing means corresponding to that described with reference to Fig. 2. In other respects the construction is substantially the same as previously described and the operation of the gate corresponds when used with a grain tank to its use with a wagon box having the straight side walls.

I claim as my invention:

1. The combination, with a receptacle having side walls and a floor and an open rear end, of a gate mounted to close said open rear end, bars pivotally connected with the upper portion of said gate and depending therefrom and having their lower ends pivotally connected with said receptacle, a bail mounted to rock on the lower portion of said gate and having crank arms formed on the ends thereof, links pivotally connecting said crank arms with the lower portions of said bars, means for temporarily locking the upper end of said gate against outward movement, the oscillation of said bail drawing the lower end of said gate outwardly to form a gap between it and said floor.

2. The combination, with a receptacle having side walls, a floor and an open rear end, of a gate mounted to close said open end, bars pivotally connected with the upper portion of said gate, rods mounted at one end in said receptacle and projecting rearwardly therefrom and having a pivotal connection with the lower portion of said bars, a cross bar whereon the lower end of said gate is seated and on which said end is mounted to turn when said gate is swung outwardly on its pivotal connection with said rods and said rods flexing upwardly to permit such turning movement, said gate, when swung down to a substantially horizontal position, forming a shoveling board, and means for supporting it in such position.

3. The combination, with a receptacle having side walls, a floor and an open rear end, of an end gate mounted to close said open end, a bail mounted on the lower portion of said gate to rock thereon and having crank arms formed thereon, means pivotally connecting said crank arms with said receptacle and also having a pivotal connection with said gate for drawing the lower portion of said gate outwardly to expose a gap between it and the floor of said receptacle when said bail is rocked, and means for securing the upper end of said gate during such movement.

4. The combination, with a receptacle having side walls, a floor and an open rear end, of a gate mounted to close said open rear end, bars pivotally connected at their upper ends to said gate and at their lower ends having a pivotal connection with said receptacle, and means mounted on the lower portion of said gate and having a pivotal connection with the lower portion of said bars for drawing the lower portion of said gate outwardly to expose a gap between it and the floor of said receptacle, and means for temporarily securing the upper end of said gate during such movement.

5. The combination, with a receptacle having side walls, a floor and an open rear end, of a gate mounted to close said open rear end, bars pivotally connected at one end to said gate and at their opposite ends to said receptacle and means having a pivotal connection with the lower portion of said bars for swinging the lower portion of said gate outwardly for a predetermined distance to expose a gap between its lower end and the floor of said receptacle, and means for temporarily securing the upper end of said gate during such movement.

6. The combination, with a wagon box having side walls, a floor and an open rear end, of an end gate mounted to close said open end and having an outward swinging movement, a bail mounted transversely on the lower portion of said gate extending from side to side thereof and having crank arms at its ends and pivotal connections between said crank arms and said gate and said box, whereby when said bail is rocked, the lower portion of said gate will be moved outwardly to expose a gap between it and the bottom of said box or inwardly to close such gap.

7. The combination, with a wagon box, of an end gate mounted to close the rear end of the box and having an outward swinging movement, a bail mounted on the lower portion of said gate and having crank arms thereon, and means having its lower portion pivotally connected with said box and with said crank arms and its upper portion pivotally connected with the upper part of said gate.

8. The combination, with a receptacle having side walls, a floor and an open rear end, of a gate mounted to close said rear end, bars pivoted to the upper portion of said gate and having a pivotal connection adjacent the lower end of said gate with said receptacle, means having a pivotal connection with the lower portion of said bars for swinging the lower end of said gate outwardly for a predetermined distance to provide a gap between it and the floor of said receptacle, means for temporarily securing the upper end of said gate, links for supporting said gate when it is swung outwardly to an open position, the pivotal connection of said bars with said receptacle forming hinges on which said gate turns downwardly to its open position.

In witness whereof, I have hereunto set my hand this 3rd day of October, 1916.

JOHN H. ANDERSON.